Nov. 13, 1934.    M. I. BRADLEY    1,980,846
UNIVERSAL JOINT
Filed March 9, 1931
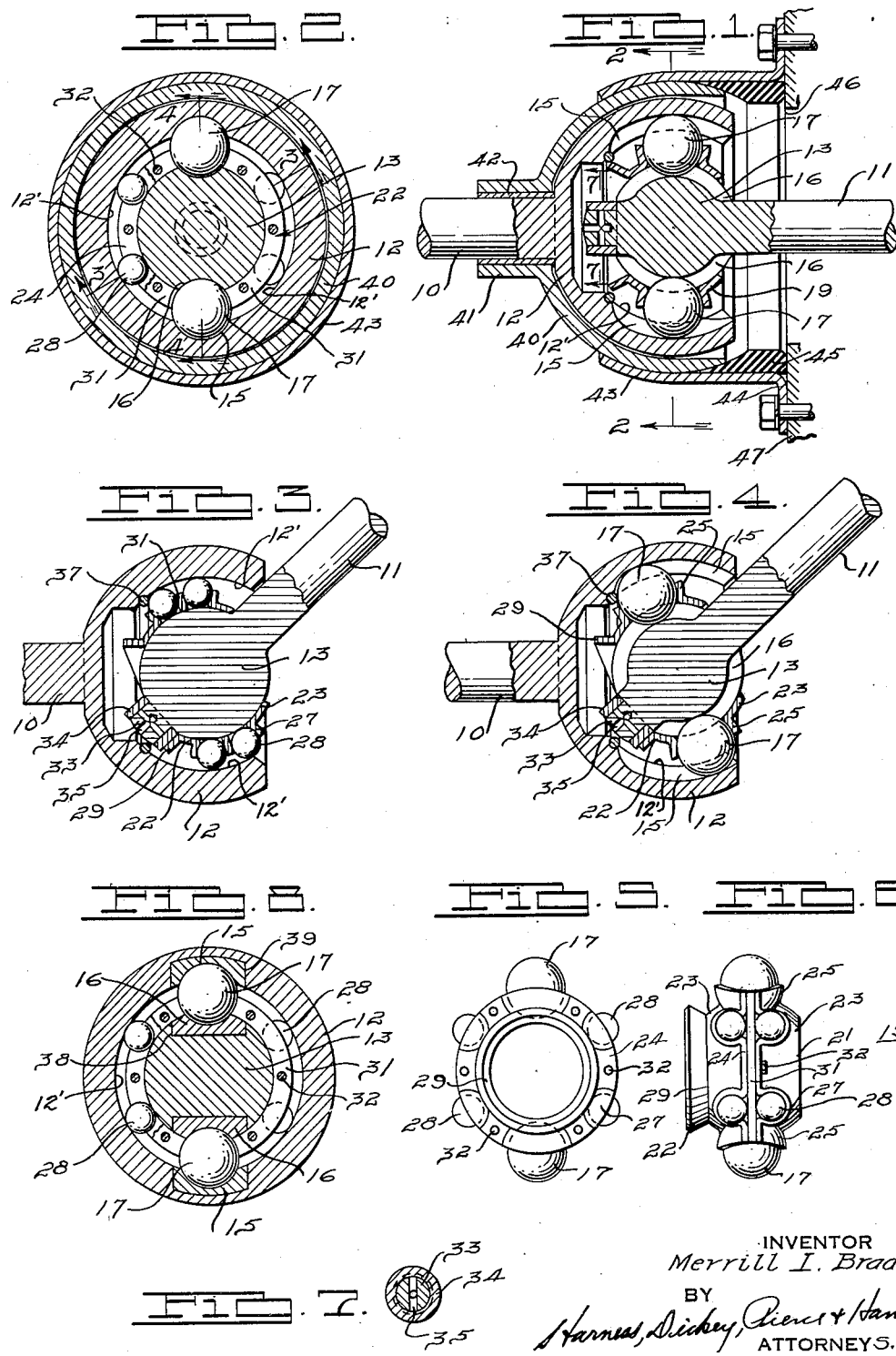
INVENTOR
Merrill I. Bradley.
BY
Harness, Dickey, Pierce & Hann
ATTORNEYS.

Patented Nov. 13, 1934

1,980,846

UNITED STATES PATENT OFFICE 1,980,846

UNIVERSAL JOINT

Merrill I. Bradley, Detroit, Mich.

Application March 9, 1931, Serial No. 521,039

15 Claims. (Cl. 64—91)

This invention relates to universal joints, and particularly to that class thereof including balls for transmitting torque between the relatively movable portions thereof.

The principal object of the present invention is to provide a universal joint of the type described that is simple in construction, efficient in operation, and economical to build.

Another object is to provide a joint of the type described having ball members for transmitting torque between the angularly movable portions of the joint, and other ball members for maintaining the relatively movable elements of the joint against relative axial movement, and for maintaining the concentricity of the angularly movable elements thereof.

Another object is to provide a novel form of ball cage for universal joints of the type described.

Another object is to provide means, in a joint of the type described, for positively moving the ball members away from their position of maximum angular displacement when the angularity of the driving and driven elements is reduced.

Another object is to provide, in a joint of the class described, a novel means for limiting the maximum angular movement of the ball members thereof during operation.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Figure 1 is a sectional view of a universal joint embodying features of my invention, Fig. 2 is a sectional view of the structure shown in Fig. 1 taken along the line 2—2 thereof, Fig. 3 is a sectional view of a portion of the structure shown in Fig. 2 taken along the line 3—3 thereof, with the shafts in maximum angularly disposed relation, Fig. 4 is a sectional view of the structure shown in Fig. 2 taken along the line 4—4 thereof, with the shafts in maximum angularly disposed relation, Fig. 5 is a view in elevation of ball bearings and a cage employed in the universal joint shown in the foregoing figures, Fig. 6 is a side view of the structure shown in Fig. 5, Fig. 7 is a sectional view of the structure shown in Fig. 1 taken along the line 7—7 thereof, Fig. 8 is a sectional view of a joint, similar to that shown in Fig. 2, illustrating a modified form which my invention may assume.

The joint embodying the present invention is applicable for use in connection with any machine or device where universal joints are needed, regardless of the amount of angularity between the driven and driving members necessitated in such constructions. However, for the purpose of description only, I have shown in the accompanying drawing a joint permitting a relatively great amount of angularity between the driving and driven elements thereof, and for the further purpose of illustration, I have shown the particular embodiment illustrated in the drawing as being of a construction particularly adaptable for use in connection with front wheel drive motor vehicles, wherein the joints between the axle or drive shafts and the wheel spindles must necessarily permit relatively great angular movement to admit the necessary angular movement of the front wheels for steering purposes.

Although it will be obvious that either element of my joint may serve as the driving element, it may be considered, for the purpose of illustration in connection with the drawing, that the shaft 10 is the driving shaft and is, therefore, suitably connected by means (not shown) to a suitable source of power (not shown). The driven shaft 11, in the illustration shown, may be considered in the nature of a spindle for engaging the hub of a wheel to be driven. A socket member 12 is rigidly secured on the end of the shaft 10 and is internally machined to provide a spherical surface 12'. Although the outer surface of the socket member 12 may ordinarily be formed to any shape desired or necessary for the particular use to which it is to be placed, it is shown in the present case as being of spherical formation concentric with the surface 12'.

The end of the shaft 11 which projects into the socket 12 is provided therein with a spherically surfaced ball member 13 which is rigidly secured thereto, and, as will be hereinafter more fully described, is maintained in concentric relation with respect to the surface 12'.

For the purpose of transmitting the torque between the socket 12 and the ball member 12, the interior spherical surface 12' of the socket member is provided with a plurality of ball races or grooves 15 which lie centrally of planes including the axis of the shaft 10, and the effective bottom surface of which grooves, in such planes, are equi-spaced over their length with respect to the surface 12'. The outer surface of the ball member 13 is provided with an equal number of equally spaced grooves 16, and received within each cooperating pair of grooves 15 and 16 is a ball member 17. The ball members 17 are of such a diameter that they have rolling contact with the bottoms of their respective grooves 15 and 16, and thus act to maintain the ball member concentric with the shell 12.

Although any desired number of cooperating pairs of grooves 15 and 16, with their cooperating ball members 17, may be employed in accordance with the present invention, I have found that under ordinary circumstances but two pairs of grooves and two balls will serve the purpose required, and accordingly only two pairs of grooves and cooperating balls are shown in the embodiment illustrated in the drawing.

As will hereinafter be apparent, it is not necessary in all cases, and in fact may not be desirable in some cases, to rely upon the balls 17 for maintaining the concentricity of the socket 12 and the ball member 13, as such concentricity is assured by the provision of a plurality of additional ball members 28 which are interposed between the outer surface of the ball member 13 and the spherical surface 12; and have substantial rolling contact with both of these surfaces. It is to be understood that no grooves are provided in either the surface of the ball member 13 or the surface 12' for the balls 28 and, consequently, the balls 28 can have no effect, in and of themselves, which might tend to prevent relative movement of the ball member 13 and socket 12 with respect to their common center. The balls 28, which are arranged in groups of two, are spaced from each other axially of the shaft 11, and consequently, regardless of the angularity of the shaft 11 with respect to the shaft 10, some of them will always be positioned on opposite sides of a plane passing through the center of the ball member 13 and normal to the axis of the shaft 11. As will be apparent, this relationship of the balls 28 with respect to the ball member 13 maintains the ball member 13 against movement in the socket 12 axially of the shaft 10.

Furthermore, as will be apparent, the balls 28 in maintaining the socket 12 and ball member 13 against relative axial movement with respect to each other, also serve to take any end thrust which may be exerted on either shaft 10 or 11. Indeed, due to the fact that any such end thrust is resisted by half of the number of balls 28, the joint is particularly useful in cases where it is either desirable or necessary to transmit a thrust through a universal joint.

Means are provided, as will hereinafter be specifically pointed out, for maintaining the relative normal positions of the balls 17 and 28 with respect to each other, but for the purpose of analyzing the structure thus far described, the maintenance of such relative positions of the ball members will be assumed. In such case it will be apparent that the construction provides for a relative universal movement between the shafts 10 and 11. For instance, referring to Fig. 1, it will be apparent that the shaft 11 is capable of movement in the plane of the drawing about the center of the ball member 13, as indicated in Fig. 4, and that such movement is accompanied by a rolling of the balls 17 in the grooves 15 and 16. Likewise the shaft 11 is capable of movement about the center of the ball member 13, in a plane normal to the plane of the drawing, in which case the point of contact between the balls 17 and the ball member 13 serve as a pivotal axis for the movement of shaft 11, as indicated in Fig. 3. The combination of these two movements provides, of course, for the universal movement of the shaft 11 relative to the shaft 10.

In view of the fact that the balls 17 and 28 have a rolling action between the socket 12 and the ball member 13, it is possible to so proportion the dimensions of the various parts to provide a joint having a maximum amount of permissible angular movement. As will be apparent, the amount of angular movement of the balls 17 and 28 about the center of the ball member 13, upon a variation in the angular relationship between the axes of the shafts 10 and 11, will depend upon the diameters of the balls, the diameter of the exterior surface of the ball member 13, and the effective diameter of the circle defined by the bottoms of the grooves 16. By proportioning the depth of the grooves 15 and 16 such as to bring the centers of the balls 17 midway between the surface 12' and the exterior surface of the ball member 13, the balls 17 and 28 will have equal rolling action between their respective cooperating surfaces. Furthermore, by proportioning the diameters of the balls 17 with respect to the diameter of the circle defined by the bottoms of the grooves 16 so that such proportion is approximately one to two, then the angular displacement of the balls relative to the center of the ball member 13 will be substantially half of the corresponding angular displacement between the axes of the shafts 10 and 11. These proportions may, of course, be varied to obtain various other proportions between the corresponding angular movements of the balls and the shafts, but I have found the proportions stated most desirable from the practical standpoint of providing a joint capable of a maximum amount of angular movement commensurate with the strength and torque resisting qualities of such joints.

It may be noted here that the length of the spherical surface 12' axially of the shaft 10 will depend, for the most part, upon the angularity which the joint has been designed to take care of in service, and where the joint is designed to take care of a relatively small variation in the angularity of the driven and driving shafts, as for instance, in the propeller shaft of a motor vehicle, the length of the spherical surface 12' axially of the shaft 10 will be substantially shorter than that illustrated in the drawing.

In order to maintain the balls 17 and 28 in their normal positions relative to each other and thus insure the proper continuous functioning of the joints, the following described means is provided for this purpose. A ball cage 19 encompasses the balls 17 and retains them in predetermined relation to each other in the ball races 15 and 16. The cage 19 is shown more clearly in Figs. 5 and 6 as including a pair of pressed metal members 21 and 22 each portion of which is provided with a frusto-spherical body portion 23 the inner surface of which engages the inner surface of the ball member 15. The large ends of the body portion 23 are provided with a flange 24 which is drawn outwardly at 25 in the shape of a spherical section the inner surface of which is struck on a radius equal to that of the radius of the ball 17.

Intermediate of the drawn portion 25, the flange is drawn at 27 into substantial cup shaped receptacles having an inner spherical surface which is struck on a radius substantially half of that of the portion 25. The purpose of the cup shaped portions 27 is to receive the plurality of balls 28 which are of a diameter substantially one half of that of the balls 17.

The body portion 22 is provided with a conical shaped flange 29 on its end opposite to that provided with the flange 24, for a purpose which will be explained hereinafter. Spacers 31 are provided between the two halves of the cage 19 and the cage is assembled by the screws 32 to constitute a unit structure.

The ball member 13 is provided with an extension 33 on its end opposite to that of the spindle 11, upon which a sleeve 34 is revolvably mounted and lubricated through the passages 35 provided in the end 33 of the ball. The sleeve 34 is positioned to engage the inner surface of the conical shaped flange 29 and to thereby retain the cage in predetermined variable relation to the spindle 11 as it is offset angularly relative to the shaft 10. As a further precaution, for preventing the cage and balls from moving beyond a predetermined position relative to the inner surface of the socket 12, I provide a split spring ring 37 which is retained by its inherent bias on the inner periphery of the surface of the socket 12 and which engages the innermost balls 28 as the cage is moved relative to the socket for limiting the movement of the cage and therefore the balls. It will, of course, be understood that the provision of a stop surface for the balls 28 may be provided by other means than the split ring 37.

The assembly of my universal joint will now be described. The portion 22 of the cage 19 is first placed in the socket 12 and the ball member 13 inserted therewithin, and the portion 22 drawn outwardly against the surface of the ball member by suitable means, not shown. The balls 17 and the inner row of balls 28 are then positioned in the cup portions 25 and 27 of the flange 24, respectively. The spacer members 31 are then placed over the balls 28 between the balls 17 and the second row of balls are then assembled along with the cage portion 21 on the ball member 17 against the spacing members 31. Screws 32 are then screwed into the threads provided in the flange 24 of the cage portion 22, to clamp the cage together to constitute a unit member.

In the ball and socket joint thus constructed, the balls 17 are maintained in diametrically opposed relation to each other by the cage 19 and the cage is prevented from bodily movement relative to the ball member 13 and the socket 12, by the plurality of balls 28 which are spaced apart by the members 31 and maintained in substantially diametrically opposed and circumferentially spaced relation by the cage.

During the movement of the spindle 11, relative to the shaft 10, the cage will move substantially half the angular distance in the same direction therewith because of the rotation of the balls 17 and 28 in the opposite direction to the movement, and to the relative diameters of the ball member 13 and ball members 17 and 28 as previously described. In this construction, when the spindle is moved through an angle of 45 degrees the cage will move only through an angle of substantially 22½ degrees. The cage is prevented from moving beyond this angular position because of the engagement of the balls 28 with the ring 37 which limits the tiltable movement of the joint, and is positively returned from such position by engagement of the roller 34 and cage flange 22. The design of the particular joint shown is such that when the spindle has been moved through an angle of substantially 45 degrees which is that shown in Fig. 4, the cage has been advanced until the balls 28 engage the ring 37 and the sleeve 34 engages the flange 29. When the spindle is moved to an angular position opposite to that shown in Fig. 4, the sleeve 34 engages the flange 29 on the opposite side of the cage to force the cage to travel, along therewith, into a position opposite to that shown in Fig. 4. In this manner the spindle 11 may be actuated throughout its range of movement and have the balls 17 displaced angularly, at no time greater than one half the maximum angularity of the shafts 10 and 11. During the normal operation, which is that of having the spindle 11 in the prolongation of the shaft 10, the balls 17 tend to center themselves and to be normal to the shaft and spindle.

In Fig. 8 I have shown a modified form of my invention wherein the races 15 and 16 are a portion of and cut off from, the outer and inner races respectively, of a standard ball bearing assembly, and are respectively exteriorly and interiorly flattened off and pressed into slots 38 and 39 in the ball member 13 and the socket 12 respectively, to provide races for the torque transmitting balls 17. In this manner the races 15 and 16, for the balls 17, may be made from a different grade of steel than the ball member 13 and the socket 12, and may be more readily machined and heat treated to a desirable hardness to prevent wear and distortion.

In Fig. 1 I have disclosed the method of sealing the universal joint from foreign matter in the nature of grit and dirt, and which permits a lubricating grease to be packed about the joint and to be retained therein during the relative movement of the axle and the spindle. A spherically surfaced cup shaped member 40 snugly fits about the outer surface of the socket 12, having a sufficient clearance therebetween to permit their relative rotation. A bearing extension 41 is provided on the end of the member 40 and is provided with a bearing 42 therein which snugly fits the shaft 10. The outer surface of the member 40 is encompassed by the spherically shaped end of the cylindrical member 43 which is provided with a flange 44 for engaging the inner surface of the wheel 47 or other member. A packing member 45, which may be felt, rubber or similar material, extends between the inner surface of the member 43 and the outer surface of the member 40 to prevent the grease therewithin from escaping outwardly between the engaging surfaces of the member. In this manner the members 40 and 43 are rotatable about the joint, and in communication through the opening 46 about the spindle 11, with the inner portion of the hub of the wheel.

While I have described and illustrated but two embodiments of my invention it will be apparent to those skilled in the art that various changes, additions, omissions and substitutions may be made therein without departing from the spirit and scope of my invention, as set forth in the accompanying claims.

I claim as my invention:

1. A universal joint for a shaft which includes, in combination, a socket and a ball member provided with raceways, a plurality of balls disposed in said raceways and interconnecting said socket and ball member for transferring torque therethrough, and additional balls, independent of the first said balls and raceways, for retaining the ball member in united relation to said socket.

2. A universal joint for a shaft which includes a socket, a ball member insertable therewithin, a cage encompassing said ball member, balls supported in said cage for retaining the ball member against longitudinal movement relative to said socket, and additional balls for locking said ball member and said socket together for equal rotation.

3. A universal joint for uniting a pair of shafts including, in combination, a socket associated with the end of one shaft on the inner surface of which raceways are provided, a ball member associated with the end of the second shaft insertable within the socket and provided with raceways in oppositely disposed relation to the first said raceways, and balls of different diametrical relation, some of which engage the raceways for retaining the socket and ball member in predetermined torque transmitting relation, and others of which retain the socket and ball member in concentric relation.

4. A universal joint for a shaft which includes, in combination, a socket having raceways provided on its inner surface, a ball member insertable therein and provided with raceways in oppositely disposed relation to the first said raceways, balls of different diametrical relation engaging the raceways and the surface of the socket and ball member, and a cage for retaining the balls in predetermined relation to each other.

5. A universal joint for a shaft including, in combination, a ball member and a socket having co-operating raceways therein, balls in said raceways, a cage about said ball member for positioning said balls, and a projection on said ball member for engaging said cage to move it therewith.

6. A universal joint for a shaft including, in combination, a ball member and a socket having co-operating raceways therein, balls in said raceways, a cage about said balls for positioning them relative to each other, a projection on said ball member, and a flange on said cage engageable by said projection to move said cage relative to the movement of said ball member.

7. A universal joint for a shaft including, in combination, a ball member and a socket having co-operating raceways therein, balls in said raceways, a cage about said ball member, a projection on said ball member, a bearing on said projection, and a flange on said cage engageable by said bearing for moving said cage relative to the movement of said ball member within a predetermined portion of its limit of movement.

8. A joint for a shaft which includes, in combination, a ball member on one portion of the shaft, a cooperating socket on another port of said shaft, a plurality of balls disposed between said ball member and socket, and means movable independently of said socket for retaining said balls on opposite sides of a plane intersecting the axis of one of said shaft portions and dividing said ball member into a pair of hemispheres.

9. A universal joint comprising a pair of shaft sections having a socket and an internally disposed ball member upon the adjacent ends thereof, means associated with said socket and ball member for transmitting the driving torque from one of said shaft sections to another, a plurality of balls disposed between the adjacent exterior and interior surfaces of said ball member and socket respectively and means movable independently of said socket and ball for maintaining said balls in properly spaced relation.

10. A universal joint comprising a pair of shaft sections having a socket and an internally disposed ball member secured upon the adjacent ends thereof, means associated with said ball member and socket for transmitting the driving torque from one of said shaft sections to another, a plurality of balls disposed between the interior surface of said socket and the exterior surface of said ball member and means movable independently of said ball member and socket for maintaining said balls within said socket and for retaining them in groups on opposite sides of a great circular path upon the surface of said ball member.

11. A universal joint comprising a pair of shaft sections having a socket and an internally disposed ball member at the adjacent ends thereof, means associated with said ball member and socket for transmitting the driving torque from one of said shaft sections to another, a cage between said ball member and socket, and a plurality of balls disposed within said cage, said balls being divided into two groups and restricted by said cage on opposite sides of a great circular path relative to said ball member and socket.

12. A universal joint comprising a pair of shaft sections having a socket and an internally disposed ball member formed on the adjacent ends thereof, means for transmitting the torque of one of said shaft sections to another, a cage interposed between said ball member and socket and a pair of groups of balls arranged within said cage on opposite sides of a plane intersecting said cage along a diameter thereof.

13. A universal joint comprising a pair of shaft sections having a socket and an internally disposed ball member arranged upon the adjacent ends thereof, a plurality of pairs of raceways formed in the adjacent surfaces of said ball member and socket and disposed in alignment with said shaft sections respectively, a ball within each of said pairs of raceways for transmitting the torque from one of said shaft sections to the other, a plurality of balls disposed between the adjacent interior and exterior surfaces of said socket and ball respectively, and means also between said socket and ball for maintaining said plurality of ball bearings in operative relation to said ball member and socket.

14. A universal joint comprising a pair of shaft sections having a socket and an internally disposed ball member at the adjacent ends thereof, a cage between said ball member and socket, a plurality of balls arranged in two groups and secured by said cage in operative relation to said ball member and socket, a plurality of pairs of raceways formed within said ball member and socket, said raceways in said ball member and socket being disposed substantially in alignment with said shaft sections respectively, and a plurality of balls within said raceways for transmitting equal rotation from one of said shaft sections to another.

15. A universal joint comprising a pair of shaft sections having a socket and an internally disposed ball member at the adjacent ends thereof, means between said socket and ball member for transmitting torque from one of said shaft sections to another, and means comprising a cage disposed between said ball member and socket and having an annular bearing formed thereon and a bearing projecting externally of said ball member and within said annular cage bearing for normally maintaining said cage in operative position relative to said ball member and socket and for finally limiting the annular position of one of said shaft sections relative to another.

MERRILL I. BRADLEY.